No. 763,214. PATENTED JUNE 21, 1904.
G. W. SMITH.
CASTER.
APPLICATION FILED OCT. 15, 1903.
NO MODEL.

Witnesses
Chas. K. Davis.
M. E. Moore.

George W. Smith,
Inventor
by
Attorney

No. 763,214. Patented June 21, 1904.

UNITED STATES PATENT OFFICE.

GEORGE WELLS SMITH, OF UNION CITY, INDIANA, ASSIGNOR TO FRED JACKSON, OF UNION CITY, INDIANA.

CASTER.

SPECIFICATION forming part of Letters Patent No. 763,214, dated June 21, 1904.

Application filed October 15, 1903. Serial No. 177,156. (No model.)

*To all whom it may concern:*

Be it known that I, GEORGE WELLS SMITH, a citizen of the United States, residing at Union City, in the county of Randolph and State of Indiana, have invented certain new and useful Improvements in Casters, of which the following is a specification.

My invention relates to improvements in casters; and the invention while capable of use in any situation where it would perform its functions in an efficient manner is particularly constructed and adapted for use as a stove-caster.

The object of my invention is the provision of a device which can be instantly adjusted for use and which can be thrown out of use and out of the way when desired and which device will be the embodiment of simplicity and efficiency.

Another object of my invention is the provision of a caster of inexpensive construction which can be easily applied to the stove-legs and which will be inexpensive of production and thoroughly practical.

With these objects in view my invention consists of a caster embodying novel features of construction and combination of parts substantially as disclosed herein.

Figure 1:
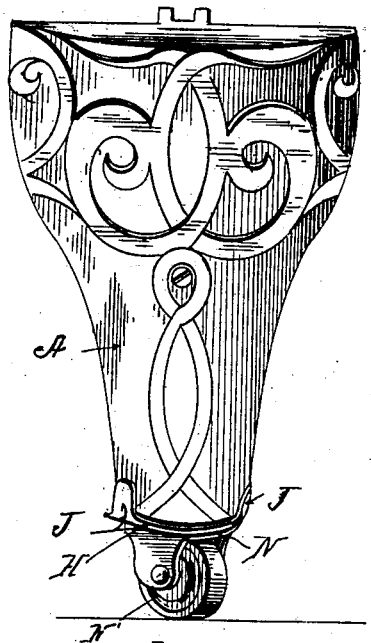
Figure 2:
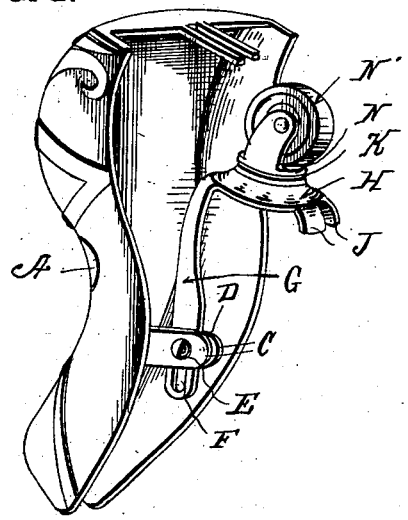
Figure 3:
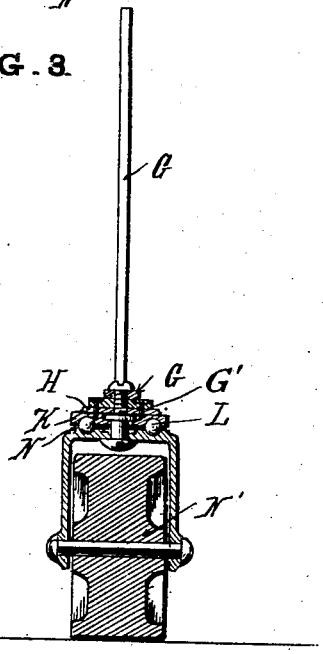
Figure 4:
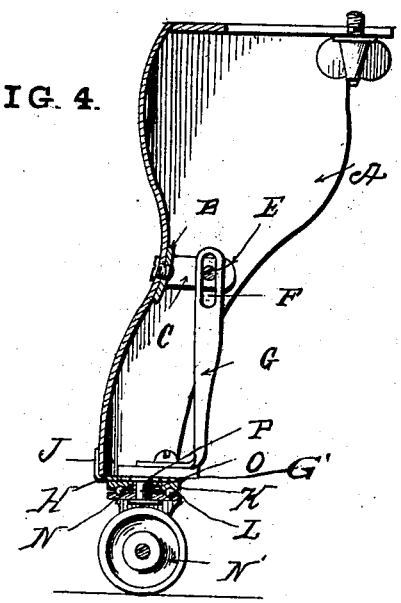

Figure 1 represents a perspective view of a stove-leg with my improved caster applied, the caster being shown in position for use. Fig. 2 represents a similar view, the caster being shown in the position assumed when not in use. Fig. 3 represents a central sectional view of the caster detached. Fig. 4 represents a longitudinal sectional view of a stove-leg with my caster applied in position for use.

I have shown my caster in connection with a stove-leg; but I would have it understood that it may be used upon other articles and perform its functions in a practical manner, and in said drawings the letter A designates the stove-leg in connection with which my caster is used. On the inner side of the stove-leg is secured the plate B, formed with the ears C, having alining openings D to receive a binding-screw E, which in use passes through the slot F in the upper end of the arm G. The lower end of the arm G is secured to the plate H, formed with the upward-extending prongs J, which engage the stove-leg, and the under side of the plate has attached thereto the cupped disk K, provided with a groove, and with the groove in the caster-frame forming the track or way for the balls L between the caster-frame N, which carries the caster-wheel N' and the cup-disk, and the pintle O of the caster-frame passes through the disk and plate and is secured firmly by the means of the head P on said pintle. The cupped disk and caster-frame it will be seen are each provided with an annular groove, which grooves form the track or raceway for the balls L. Also between the lower end of arm G and the plate H is interposed a plate G', said plate G' serving as a base to connect the lower end of the arm G and a covering for the pintle O, as will be readily apparent. From this construction it will be seen that I provide a caster which can be quickly thrown in or out of use, which engages the stove-leg and is held in proper position with reference thereto, and which device is thoroughly efficient and practical in every particular. It will also be understood that by reason of the elongated slot in the arm of the caster the device can be adjusted vertically to suit the length of the leg and that the slot also allows the caster to be raised and lowered with ease.

I claim—

1. In a caster the combination with an attaching device, an arm pivotally connected to said device near its upper end, a plate secured to the lower end of said arm and having prongs for holding said plate to the object, the cupped disk secured to said plate, a caster-frame, said caster-frame and cupped disk having annular grooves and balls arranged in said grooves for rotatably mounting the caster to the plate.

2. In a caster, the combination with a stove-leg, the horizontal attaching-plate secured to the stove-leg, the arm having the upper slotted end connected to said attaching-plate, and having the lower end formed at a right angle thereto, the plate secured to the lower end of said arm, the cupped disk connected to said plate and formed with a ball-channel, the caster-frame carrying the caster-wheel and formed with a ball-channel and the balls bearing in the channels or grooves formed between the cupped disk and the caster-frame.

In testimony whereof I affix my signature in presence of two witnesses.

GEO. WELLS SMITH.

Witnesses:
GEORGE GOUGH,
JOHN A. SHOCKNEY.